(12) United States Patent
Baker et al.

(10) Patent No.: US 7,290,974 B1
(45) Date of Patent: Nov. 6, 2007

(54) MOUNTABLE HITCH

(76) Inventors: Gary E. Baker, HCR 89 Box 291, Hermosa, SD (US) 57744; James Baker, P.O. Box 148, Hermosa, SD (US) 57744

( * ) Notice: Subject to any disclaimer, the term of this patent is extended or adjusted under 35 U.S.C. 154(b) by 343 days.

(21) Appl. No.: 10/921,727

(22) Filed: Aug. 19, 2004

(51) Int. Cl.
*B60P 3/42* (2006.01)
(52) U.S. Cl. .................................. 414/498; 298/17 R
(58) Field of Classification Search ............... 414/498, 414/462; 298/17 R
See application file for complete search history.

(56) References Cited

U.S. PATENT DOCUMENTS

| | | | |
|---|---|---|---|
| 3,881,619 A | 5/1975 | Morris | |
| 3,907,333 A | 9/1975 | Gianessi et al. | |
| 4,049,146 A | 9/1977 | Decker | |
| 4,152,006 A | 5/1979 | Dunlap | |
| 4,192,524 A | 3/1980 | Twiestmeyer | |
| 4,261,594 A | 4/1981 | Corbett et al. | |
| 4,614,354 A | 9/1986 | Stagner | |
| 4,671,526 A | 6/1987 | Booher | |
| 4,671,527 A | 6/1987 | Wilson et al. | |
| 4,711,500 A * | 12/1987 | Spanton et al. | 298/17 S |
| 4,958,978 A | 9/1990 | Shedleski | |
| 4,969,690 A | 11/1990 | Smith | |
| 5,056,984 A | 10/1991 | Hesterman | |
| 5,098,019 A * | 3/1992 | Landefeld | 239/172 |
| 5,184,872 A | 2/1993 | Larochelle et al. | |
| 5,297,911 A | 3/1994 | Powell | |
| 5,310,204 A | 5/1994 | Bagley, Jr. | |
| 5,354,165 A | 10/1994 | Booher | |
| 5,417,540 A * | 5/1995 | Cox | 414/495 |
| 5,447,361 A | 9/1995 | Phillips | |
| 5,601,393 A * | 2/1997 | Waldschmitt | 414/498 |
| 5,722,678 A | 3/1998 | Hunger | |
| 5,823,735 A | 10/1998 | Kooima | |
| 5,890,728 A | 4/1999 | Zilm | |
| 6,024,372 A | 2/2000 | Colibert et al. | |
| 6,042,135 A | 3/2000 | Ross | |
| 6,056,308 A | 5/2000 | Harrison | |
| 6,059,371 A | 5/2000 | Smith et al. | |
| 6,092,863 A * | 7/2000 | Hagenbuch et al. | 414/498 |
| 6,135,482 A | 10/2000 | Larkin | |
| 6,203,046 B1 | 3/2001 | Meurer | |
| 6,302,423 B1 | 10/2001 | Alexander | |
| 6,419,292 B1 | 7/2002 | Calcote et al. | |
| 6,505,891 B1 | 1/2003 | Hickey et al. | |
| 6,557,944 B1 | 5/2003 | Connor | |

* cited by examiner

*Primary Examiner*—Charles A Fox

(57) ABSTRACT

A mountable hitch for converting a normally fixed mounted material hauling device for use with a fifth wheel capable vehicle. The mountable hitch includes a mountable frame assembly selectively engaging the vehicle. A load carrying device is coupled to the frame assembly. The load carrying device is for containing material when the mountable frame assembly engages the vehicle and the load carrying device is transported by the vehicle. A securing assembly selectively engages the load carrying device. The securing assembly is coupled to the vehicle whereby the securing assembly inhibits the load carrying device and the mountable frame assembly from sliding off of the vehicle when the load carrying device engages the securing assembly.

29 Claims, 7 Drawing Sheets

MOUNTABLE HITCH

BACKGROUND OF THE INVENTION

1. Field of the Invention

The present invention relates to fifth wheel conversion systems and more particularly pertains to a new mountable hitch for converting a normally fixed mounted material hauling device for use with a fifth wheel capable vehicle.

2. Description of the Prior Art

The use of fifth wheel conversion systems is known in the prior art. More specifically, fifth wheel conversion systems heretofore devised and utilized are known to permanently convert fifth wheel capable vehicles to carry material handling devices on the frame of the vehicle or convert a trailer towed by a vehicle to perform the same function of material handling devices. The mountable hitch allows the fifth wheel capable vehicles to temporarily engage material handling devices and still be used to tow trailers when the material handling devices are disengaged from the fifth wheel capable vehicles.

Illustrative of the fifth wheel conversion systems is U.S. Pat. No. 6,302,423 to Alexander which provides a pair of spaced apart brackets that extend across and are mounted to the frame of the vehicle. A pair of bars then extend across the brackets and support the device above the fifth wheel of the vehicle. U.S. Pat. No. 5,184,872 to Larochelle provides a semi-trailer dump trailer that has an articulated frame assembly and a ram positioned between the fifth wheel and the dump trailer to allow the trailer to be raised high enough to completely dump the materials from the dump trailer.

U.S. Pat. No. 4,969,690 to Smith provides a conversion apparatus that is used for mounting a truck bed onto a chassis of a tractor with a fifth wheel to allow the truck bed to be selectively mounted to the tractor. U.S. Pat. No. 4,671,527 to Wilson provides a fifth wheel with a linkage mechanism for raising and lowering the fifth wheel to accommodate trailers of differing heights. U.S. Pat. No. 6,135,482 to Larkin provides hitch adaptor that can receive either a king pin or a ball hitch to allow a trailer to be coupled to a vehicle. U.S. Pat. No. 6,505,891 to Hickey provides an end dump trailer with a tension frame assembly coupled to the container and the vehicle to support the frameless container when the container is being tilted to be dumped.

U.S. Pat. Nos. 5,447,361, 6,557,944 and 6,419,292 each provide an apparatus for converting a truck bed to be used on a vehicle not originally designed to use that truck bed. U.S. Pat. Nos. 5,354,165 and 4,958,978 each provide a dump trailer with a modified frame structure to allow the containers of the dump trailers to be tilted to allow the contents of the containers to be dispensed from the containers.

U.S. Pat. No. 4,152,006 provides a towing apparatus that is coupled to a towing vehicle having a conventional fifth wheel and allows for the towing vehicle to tow a trailer or another vehicle as is needed. U.S. Pat. No. 3,907,333 provides a mounting means coupled to an earthmoving vehicle that allows attachments to be mounted to the earthmoving vehicle. U.S. Pat. No. 4,671,526 provides a coupler device for use on frameless dump trailers that guides and positions the dump body on the fifth wheel plate of a vehicle. U.S. Pat. No. 6,059,371 provides a hinge for being coupled between the bed of a truck and a frame of the truck to allow the bed of the truck to be pivoted with respect to the frame of the truck.

The prior art contains many examples of adaptor assemblies for allowing a trailer having a particular style of hitch to being coupled to a vehicle having a different type of receiver. Illustrative examples of the adaptor assemblies are U.S. Pat. Nos. 6,203,046, 4,261,594, 5,056,984, 5,823,735, 6,024,372, 5,310,204, 6,056,308, 6,042,135, 5,890,728, 5,722,678, 5,297,911, 4,614,354, 4,192,524, 4,049,146 and 3,881,619.

In these respects, the mountable hitch according to the present invention substantially departs from the conventional concepts and designs of the prior art, and in so doing provides an apparatus primarily developed for the purpose of converting a normally fixed mounted material hauling device for use with a fifth wheel capable vehicle.

SUMMARY OF THE INVENTION

In view of the foregoing disadvantages inherent in the known types of fifth wheel conversion systems now present in the prior art, the present invention provides a new mountable hitch construction wherein the same can be utilized for converting a normally fixed mounted material hauling device for use with a fifth wheel capable vehicle.

To attain this, the present invention generally comprises a mountable frame assembly selectively engaging the vehicle. A load carrying device is coupled to the frame assembly. The load carrying device is for containing material when the mountable frame assembly engages the vehicle and the load carrying device is transported by the vehicle. A securing assembly selectively engages the load carrying device. The securing assembly is coupled to the vehicle whereby the securing assembly inhibits the load carrying device and the mountable frame assembly from sliding off of the vehicle when the load carrying device engages the securing assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One significant advantage of the present invention is the capability to quickly engage the load carrying device to the vehicle or quickly disengage the load carrying device from the vehicle so that the user of the invention can avoid time consuming conversion operations when it is desired to change the use of the vehicle.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
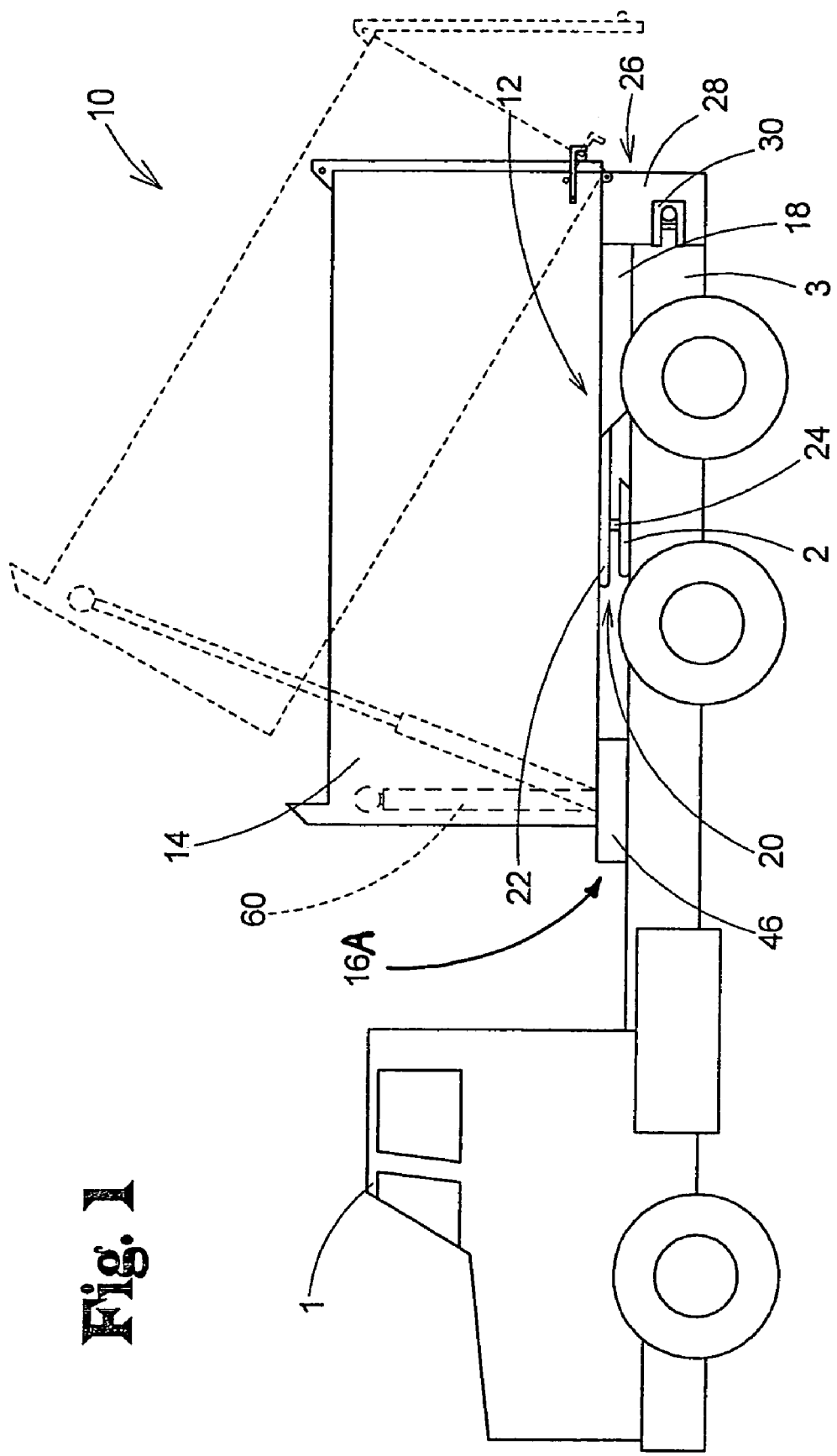
FIG. 1 is a side view of a new mountable hitch according to the present invention shown with the dump body for the load carrying device.
Figure 2:
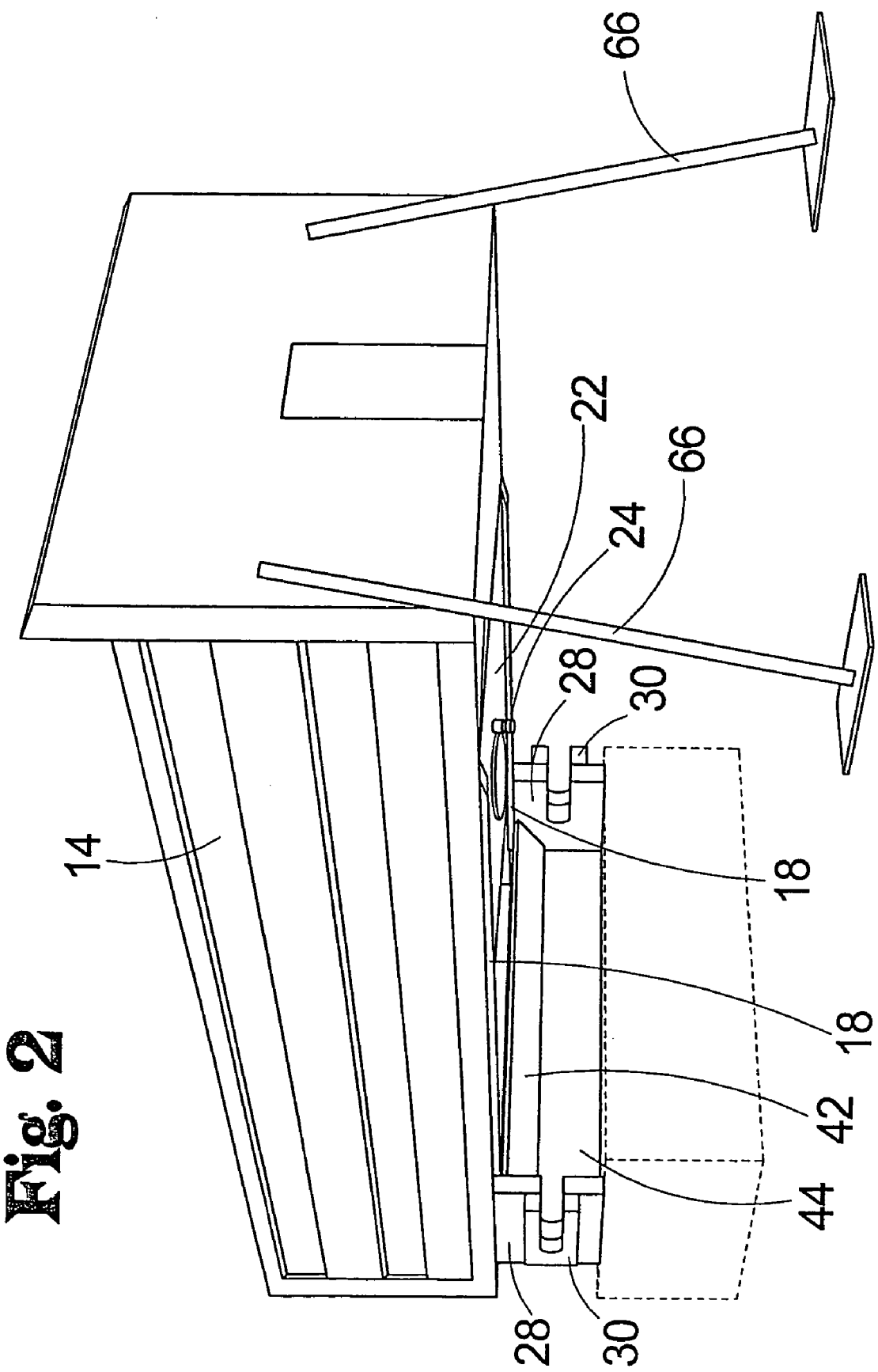
FIG. 2 is a lower perspective view of the load carrying device and the mountable frame assembly of the present invention.
Figure 3:
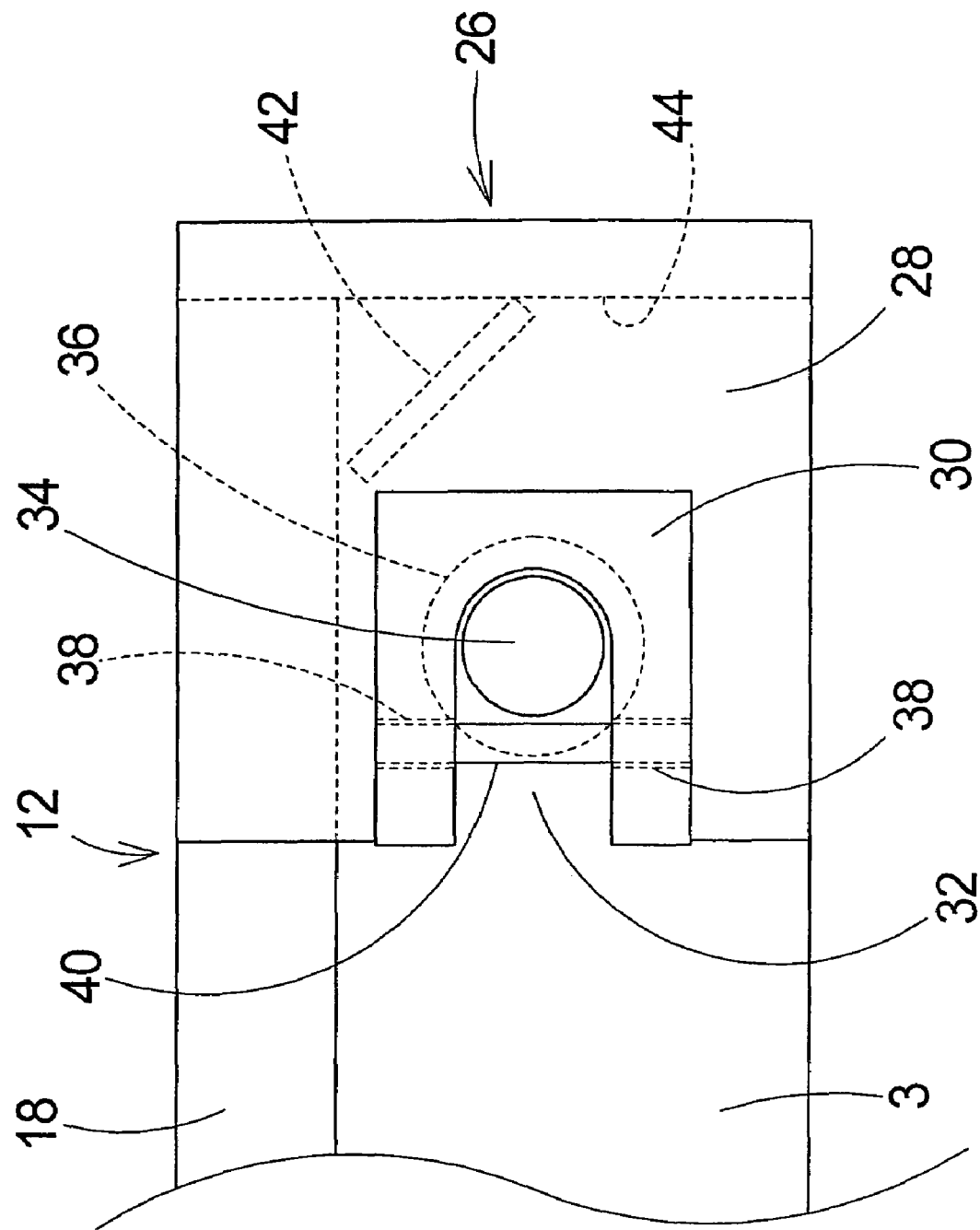
FIG. 3 is an enlarged side view of one of the hinge assemblies of the present invention.
Figure 4:
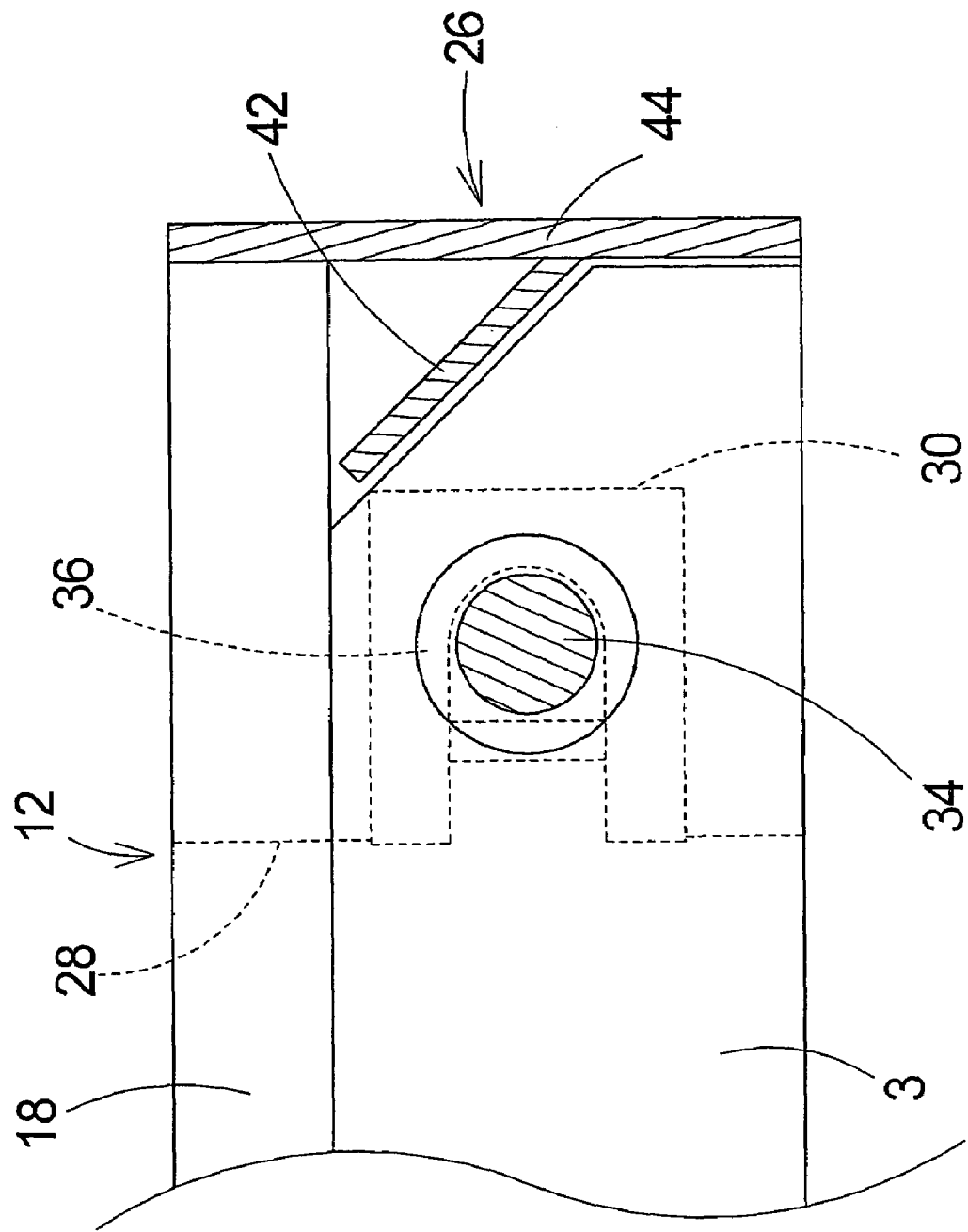
FIG. 4 is a cross-sectional view of the anchor pin, angled brace and the bracing member of the present invention taken between the frame rails of the vehicle.

With reference now to the drawings, and in particular to FIGS. 1 through 7 thereof, a new mountable hitch embodying the principles and concepts of the present invention and generally designated by the reference numeral 10 will be described.

As best illustrated in FIGS. 1 through 7, the mountable hitch 10 generally comprises a mountable frame assembly 12 selectively engaging the vehicle 1, such as a semi tractor. The mountable frame assembly 12 engages frame rails 3 of the vehicle 1 where the mountable frame assembly 12 is positioned on top of the frame rails 3 and behind the cab of the vehicle 1.

A load carrying device 14, such as a dump body or a tank, is operationally coupled to the frame assembly 12. The load carrying device 14 is for containing material when the mountable frame assembly 12 engages the vehicle 1 and the load carrying device 14 is transported by the vehicle 1.

A securing assembly 16A selectively engages the load carrying device 14. The securing assembly 16A is coupled to the vehicle 1 whereby the securing assembly 16A is positioned on top the frame rails 3 of the vehicle 1 and located behind the cab of the vehicle 1. The securing assembly 16A inhibits the load carrying device 14 and the mountable frame assembly 12 from sliding off of the vehicle 1 when the securing assembly 16A engages the load carrying device 14.

The mountable frame assembly 12 may comprise a plurality of frame members 18. Each of the frame members 18 is coupled to the load carrying device 14 to provide support for the load carrying device 14 when the load carrying device 14 is being transported by the vehicle 1. Each of the frame members 18 are positioned along the top of an associated one of the frame rails 3 of the vehicle 1 to provide support for the load carrying device 14 on the frame rails 3 of the vehicle 1.

The mountable frame assembly 12 comprises a hitching assembly 20 being coupled to the frame members 18 of the mountable frame assembly 12. The hitching assembly 20 selectively engages the vehicle 1 to secure the mountable frame assembly 12 and the load carrying device 14 to the vehicle 1.

The hitching assembly 20 comprises a base plate 22 and a king pin 24. The base plate 22 is coupled to the frame members 18 so that the base plate 22 extends between the frame members 18. The king pin 24 is coupled to the base plate 22 so that the king pin 24 extends downwardly from the base plate 22. The king pin 24 is selectively received by a fifth wheel 2 of the vehicle 1 to secure the mountable frame assembly 12 and the load carrying device 14 to the vehicle 1.

At least one and preferably a plurality of hinge assemblies 26, are coupled to the mountable frame assembly 12. Each of the hinge assemblies 26 selectively engages the vehicle 1 to secure the mountable frame assembly 12 to the vehicle 1 to permit pivoting of the load carrying device 14 with respect to vehicle 1 for some types of load carrying devices 14.

Each of the hinge assemblies 26 comprises a hinge plate 28. The hinge plate 28 of each of the hinge assemblies 26 operationally couples to the ends of the frame rails 3 of the vehicle 1 to secure the hinge assemblies 26 to the vehicle 1.

Each of the hinge assemblies 26 comprises a block member 30. The block member 30 is coupled to the hinge plate 28 of the associated one of the hinge assemblies 26. The block member 30 of each of the hinge assemblies 26 operationally engages the frame rails 3 of the vehicle 1 to secure the load carrying device 14 to the vehicle 1. The block member 30 of each the hinge assemblies 26 comprises a block slot 32 that extends into the block member 30 to create a generally U-shaped configuration.

An anchor pin 34 is coupled to the frame rails 3 of the vehicle 1. The block slot 32 of the block member 30 of each of the hinge assemblies 26 receives the anchor pin 34 to secure the mountable frame assembly 12 to the vehicle 1. A pair of retaining members 36 are coupled to the anchor pin 34 so that each of the retaining members 36 engages one of the frame rails 3 and inhibits the anchor pin 34 from sliding out of the frame rails 3 of the vehicle 1.

The block member 30 of each of the hinge assemblies 26 comprises a pair of pin apertures 38 extending through the block member 30. Each of the pin apertures 38 is in communication with the block slot 32 of the block member 30 whereby the pin apertures 38 are positioned substantially perpendicular to the block slot 32 of the block member 30. One of the pin apertures 38 of a block member 30 is axially aligned with the other of the pin apertures 38 of the same block member 30.

Each of the hinge assemblies 26 comprises a securing pin 40. The securing pin 40 is insertable into the pin apertures 38 of the block member 30 of the associated one of the hinge assemblies 26 so that the securing pin 40 extends across the block slot 32 of the block member 30. The securing pin 40 thus inhibits or blocks movement of the anchor pin 34 from sliding out of the block slot 32 of the block member 30 when the securing pin 40 is inserted into the pin apertures 38 of the block member 30 of the associated one of the hinge assemblies 26.

An angled brace 42 extends between and is coupled the hinge assemblies 26. The angled brace 42 maintains the proper positioning of the hinge assemblies 26 when the hinge assemblies 26 engage the vehicle 1. The angle of the angled brace 42 preferably corresponds with and is complimentary to the angle of the back end of the frame rails 3 of the vehicle 1.

A bracing member 44 is coupled to the mountable frame assembly 12 and the hinge assemblies 26. The bracing member 44 maintains the proper positioning of the mountable frame assembly 12 and the hinge assemblies 26 with respect to each other when the hinge assemblies 26 engage the vehicle 1. Additional bracing may be applied between the frame members 18 to provide additional rigidity and support to the mountable frame assembly 12.

The securing assembly 16A comprises a base frame 46 for being coupled to the vehicle 1. The base frame 46 selectively engages the load carrying device 14 to secure the load carrying device 14 to the vehicle 1 when the mountable frame assembly 12 engages the vehicle 1.

The securing assembly 16A comprises at least one, and preferably a plurality, of receiving members 48. Each of the receiving members 48 is coupled to the base frame 46. The receiving members 48 selectively engage the load carrying device 14 to secure the load carrying device 14 to the base frame 46 and the vehicle 1.

Each of the receiving members 48 comprises a receiving slot 50 that extends into the respective receiving member 48. The receiving slot 50 of each of the receiving members 48 receives a portion of the load carrying device 14 to secure the load carrying device 14 to the vehicle 1.

Each of the receiving members 48 comprises a retaining pin 52. The retaining pin 52 is selectively insertable into a pair of retaining apertures 54 of the associated one of the receiving members 48. The retaining apertures 54 are in communication with the receiving slot 50 of the associated one of the receiving members 48 so that the retaining pin 52 may be positioned across the receiving slot 50 to inhibit inadvertent removal of the portion of the load carrying device 14 from the receiving slot 50 when the retaining pin 52 is positioned in the retaining apertures 54.

Figure 5:
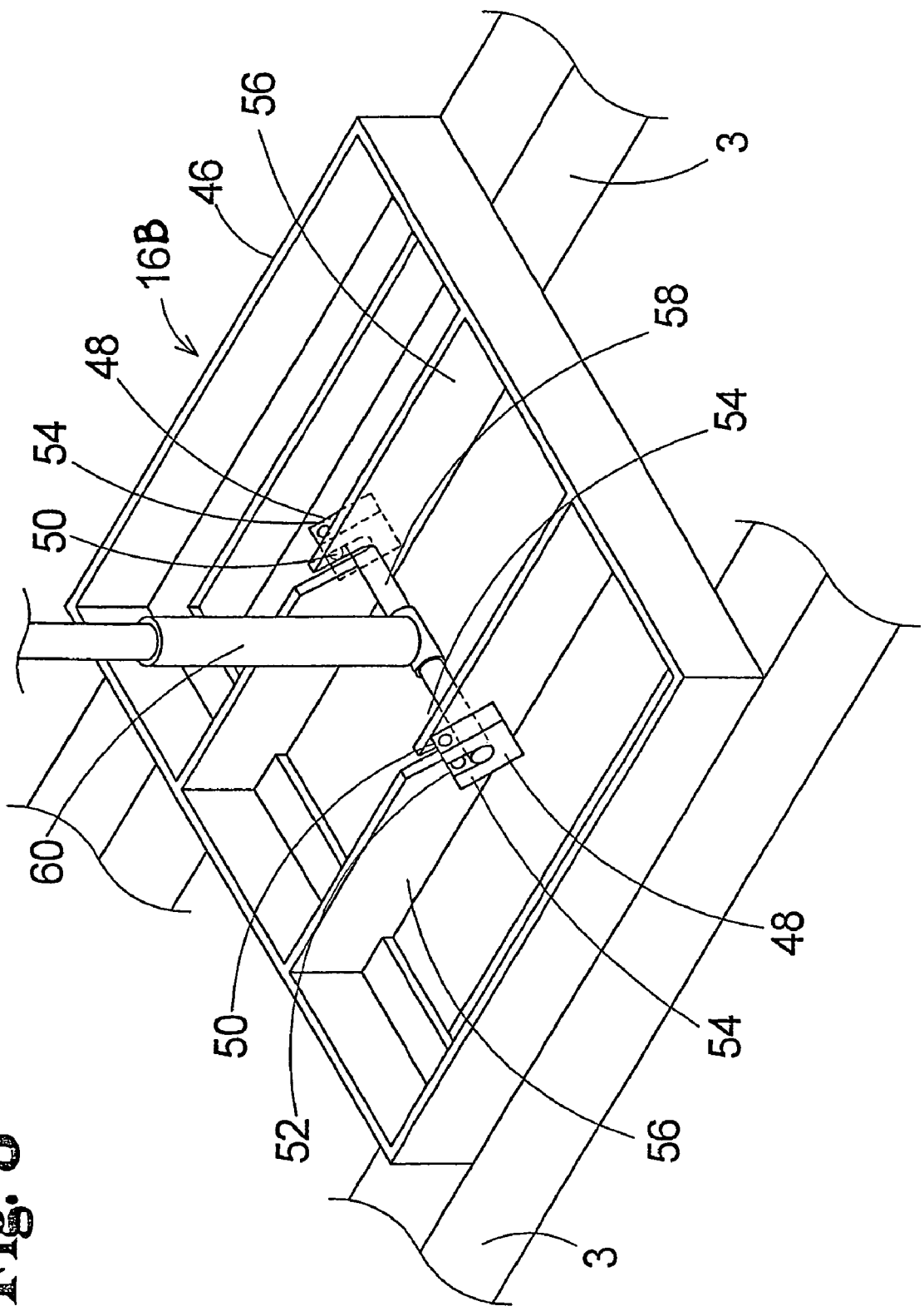
FIG. 5 is a top perspective view of the securing assembly of the present invention shown in FIG. 1.

In an embodiment, as shown in FIG. 5, the receiving members 48 are coupled to center braces 56 of the base frame 46 and are positioned at an angle to the vehicle 1. A pivot rod 58 is positioned in the receiving slot 50 of each of the receiving members 48 and is secured in the receiving slot 50 by the retaining pin 52 of the associated one of the receiving members 48. The end of a hydraulic ram 60 is coupled to the pivot rod 58 and the load carrying device 14, specifically the dump body. Actuation of the hydraulic ram 60 permits the load carrying device 14 and frame assembly 12 to be pivoted with respect to the frame rails 3 of the vehicle 1 and allow the material being transported by the load carrying device 14 to be dispensed from the load carrying device 14 when the king pin 24 is disengaged from the fifth wheel 2 of the vehicle 1. Alternately, the load carrying device 14 is pivotally coupled to the frame assembly 12 so that the load carrying device 14 is pivoted with respect to the frame assembly, which is engaged to the frame rails 3 of the vehicle 1, to allow the contents of the load carrying device 14 to be dumped from the load carrying device 14 when hydraulic ram 60 is actuated.

Figure 6:
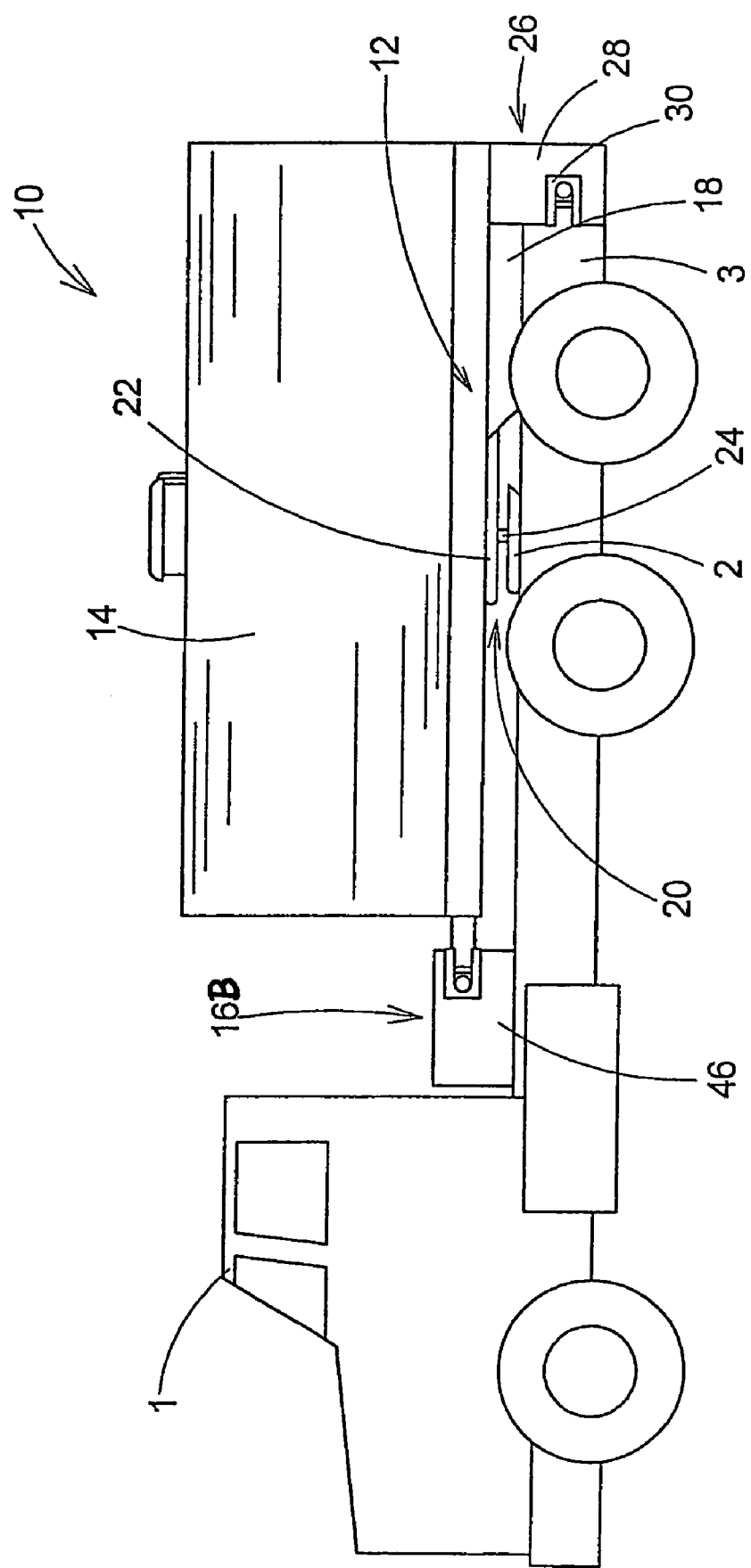
FIG. 6 is a side view of an embodiment of the present invention showing the tank for the load carrying device.
Figure 7:
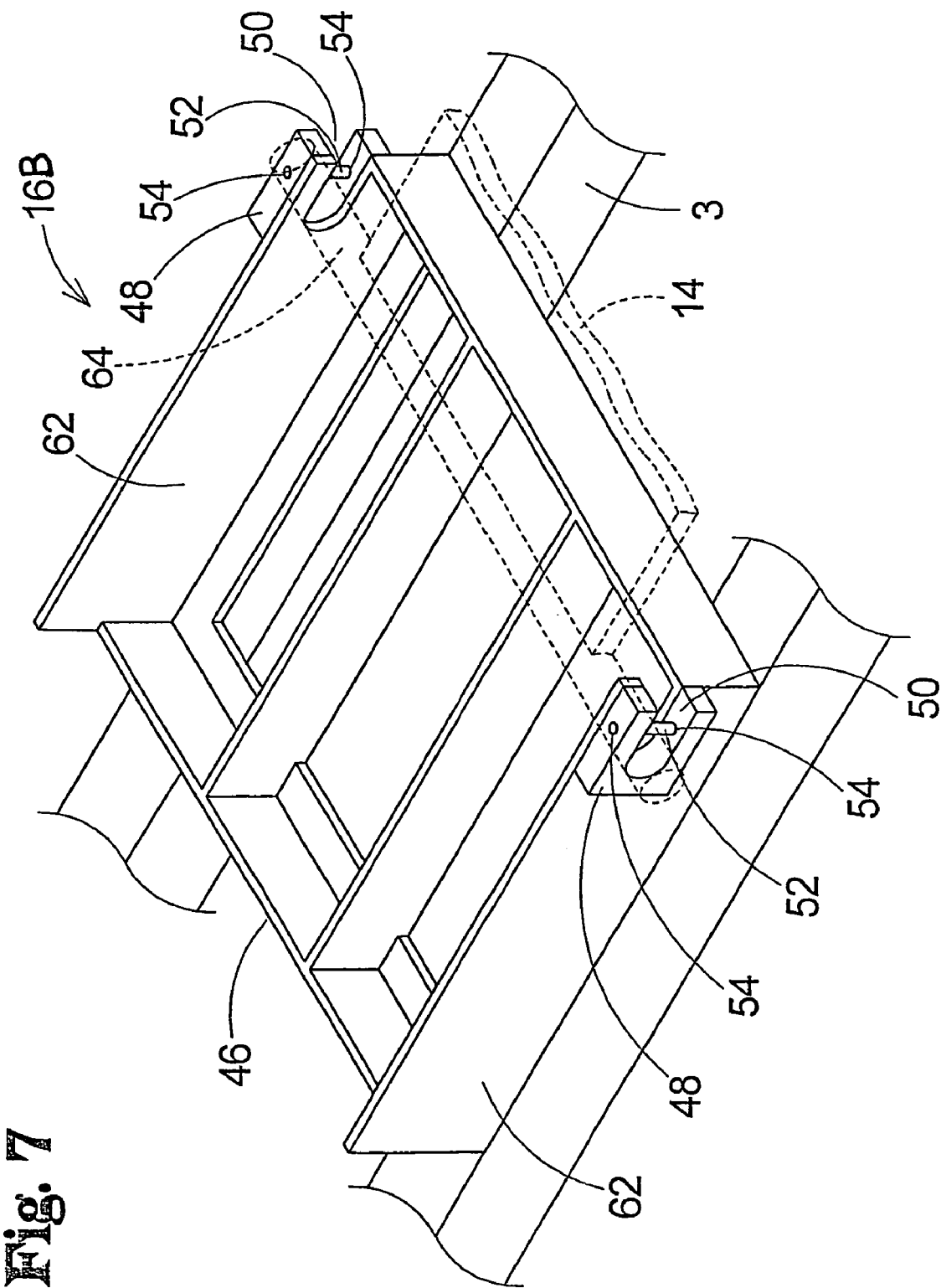
FIG. 7 is a top perspective view of an embodiment of the securing assembly of the embodiment of the present invention shown in FIG. 6.

In an embodiment, as shown in FIGS. 6 and 7, the receiving members 48 of a securing assembly 16B are coupled to end braces 62 of the base frame 46 and are positioned substantially parallel to the frame rails 3 of the vehicle 1. A securing rod 64 is positioned in the receiving slot 50 of each of the receiving members 48 and secured in the receiving slot 50 by the retaining pin 52 of the associated one of the receiving members 48. The securing rod 64 is coupled to the load carrying device 14, such as a tank, to allow the load carrying device 14 to be secured to the securing assembly 16B and inhibit inadvertent movement of the load carrying device 14 with respect to the vehicle 1.

A plurality of leg members 66 my be operationally coupled to the load carrying device 14 so that each of the leg members 66 extends substantially downwardly and outwardly from the load carrying device 14. Each of the leg members 66 is for engaging a support surface so that the leg members 66 support the load carrying device 14 and the mountable frame assembly 12 above the support surface to permit the vehicle 1 to be moved under the load carrying device 14 and the mountable frame assembly 12 when the mounted frame assembly 12 is to be mounted on the vehicle 1. Each of the leg members 66 is selectively actuated to allow the leg members 66 to disengage the support surface when the load carrying device 14 is being transported by the vehicle 1.

In use, the base plate 22 is coupled to the frame members 18 of the mountable frame assembly 12. The king pin 24 is extended through the base plate 22 and secured to the base plate 22. At least one of the hinge assemblies 26 is coupled to each of the frame members 18 whereby the hinge assemblies 26 are positioned opposite the base plate 22. The hinge plate 28 of each of the hinge assemblies 26 is coupled to one of the frame members 18 whereby the block member 30 is offset from the frame members 18. The anchor pin 34 is coupled to the frame rails 3 of the vehicle 1 whereby the block member 30 of each of the hinge assemblies 26 engages the anchor pin 34 to secure the load carrying device 14 to the vehicle 1. The frame members 18 and the base plate 22 are coupled to the load carrying device 14 whereby the frame assembly 12 is positioned under the load carrying device 14. The securing assembly 16A, 16B is coupled to the frame rails 3 of the vehicle 1. The legs are coupled to the load carrying device 14 whereby the legs support the load carrying device 14 above the support surface. The vehicle 1 is backed under the mountable frame assembly 12. The king pin 24 engages the fifth wheel 2 of the vehicle 1. The hinge assemblies 26 are secured to the anchor pin 34. The load carrying device 14 is secured to the securing assembly 16 to inhibit sliding of the load carrying device 14 with respect to the vehicle 1 when the load carrying device 14 is being transported.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A mountable hitch apparatus for engaging a vehicle, the mountable hitch apparatus comprising:

a mountable frame assembly for selectively engaging the vehicle;

a load carrying device removably mountable on said frame assembly for containing material when said mountable frame assembly engages the vehicle; and a securing assembly selectively engaging said load carrying device, said securing assembly for coupling to the vehicle such that said securing assembly inhibits said load carrying device and said mountable frame assembly from inadvertently moving off of the vehicle when said load carrying device engages said securing assembly wherein said securing assembly is separate of said mountable frame assembly and is configured to be separately mountable on the vehicle of said mountable frame assembly;

pivot actuation means for pivoting a portion of said load carrying device with respect to said mountable frame, said pivot actuation means being mounted on said portion of said load carrying means and being removably mounted on said securing assembly separate of said mountable frame;

wherein said pivot actuation means comprises a ram and a pivot rod mounted on said ram towards one end of said ram; and wherein said securing assembly defines at least one receiving slot for removably receiving said pivot rod, said slot being elongate with a longitudinal axis, said securing assembly being configured such that said longitudinal axis of said receiving slot is inclined with respect to a frame rail of the vehicle when said securing assembly is engaged with the frame rail.

2. The mountable hitch apparatus as set forth in claim 1, wherein said mountable frame assembly comprises at least one frame member, said at least one frame member being coupled to said load carrying device;

wherein said mountable frame assembly comprises a hitching assembly coupled to said at least one frame member and configured to selectively engaging the vehicle to secure said mountable frame assembly and said load carrying device to the vehicle; and wherein said hitching assembly comprises a base plate and a king pin, said base plate being coupled to said at least one frame member, said king pin being coupled to said base plate such that said king pin extends downwardly from said base plate for being selectively received by a fifth wheel of the vehicle to secure said mountable frame assembly and said load carrying device to the vehicle.

3. The mountable hitch apparatus as set forth in claim 1, further comprising:

a plurality of hinge assemblies being coupled to said mountable frame assembly, each of said hinge assemblies selectively engaging the vehicle to secure said mountable frame assembly to the vehicle;

wherein each of said hinge assemblies comprises a hinge plate for operationally coupling to frame rails of the vehicle to secure the hinge assemblies to the vehicle.

4. The mountable hitch apparatus as set forth in claim 3, wherein each of said hinge assemblies comprises a block member, said block member being coupled to said hinge plate of the associated one of said hinge assemblies, said block member of each of said hinge assemblies being for operationally engaging the frame rails of the vehicle to secure said load carrying device to the vehicle.

5. The mountable hitch apparatus as set forth in claim 4, wherein said block member of each said hinge assemblies defines a block slot extending into said block member; and an anchor pin for being coupled to the frame rails of the vehicle, said block slot of said block member of each of said hinge assemblies receiving said anchor pin to secure said mountable frame assembly to the vehicle.

6. The mountable hitch apparatus as set forth in claim 5, wherein said block member of each of said hinge assemblies comprises a pair of pin apertures extending through said block member, each of said pin apertures being in communication with said block slot of said block member, one of said pin apertures being aligned with the other of said pin apertures; and each of said hinge assemblies comprising a securing pin, said securing pin being insertable into said pin apertures of said block member of the associated one of said hinge assemblies such that said securing pin extends across said block slot of said block member to inhibit said anchor pin inadvertently sliding out of said block slot of said block member when said securing pin is inserted into said pin apertures of said block member of the associated one of said hinge assemblies.

7. The mountable hitch apparatus as set forth in claim 3, further comprising:

an angled brace being coupled to and extending between said hinge assemblies, said angled brace maintaining positioning of said hinge assemblies when said hinge assemblies engage the vehicle.

8. The mountable hitch apparatus as set forth in claim 3, further comprising:

a bracing member being coupled to said mountable frame assembly and said hinge assemblies, said bracing member maintaining positioning of said mountable frame assembly and said hinge assemblies when said hinge assemblies engage the vehicle.

9. The mountable hitch apparatus as set forth in claim 1, wherein said securing assembly comprises a base frame for being coupled to the vehicle, said base frame selectively engaging said load carrying device to secure said load carrying device to the vehicle when said mountable frame assembly engages the vehicle.

10. The mountable hitch apparatus as set forth in claim 9, wherein said securing assembly comprises a plurality of receiving members, each of said receiving members being coupled to said base frame, said receiving members selectively engaging said load carrying device to secure said load carrying device to said base frame and the vehicle.

11. The mountable hitch apparatus as set forth in claim 10, wherein each of said receiving members comprises a receiving slot extending into the associated one of said receiving members, said receiving slot of each of said receiving members receiving a portion of said load carrying device to secure said load carrying device to the vehicle.

12. The mountable hitch apparatus as set forth in claim 11, wherein each of said receiving members comprises a retaining pin, said retaining pin being selectively insertable into a pair of retaining apertures of the associated one of said receiving members, said retaining apertures being in communication with said receiving slot of the associated one of said receiving members such that said retaining pin extends across said receiving slot to inhibit inadvertent removal of the portion of said load carrying device from said receiving slot when said retaining pin is positioned in said retaining apertures.

13. The mountable hitch apparatus as set forth in claim 1, further comprising:

a plurality of leg members being operationally coupled to said load carrying device such that each of said leg members extends substantially downward from said load carrying device, each of said leg members being for engaging a support surface such that said leg members support said load carrying device and said mountable frame assembly above the support surface to permit the vehicle to be backed under said load carrying device and said mountable frame assembly when said mounted frame assembly is to engage the vehicle, each of said leg members being selectively actuated to allow said leg members to disengage the support surface when said load carrying device is being transported by the vehicle.

14. A mountable hitch system comprising:

a vehicle;

a mountable frame assembly removably mounted on said vehicle;

a load carrying device being mounted on said frame assembly for containing material when said mountable frame assembly is mounted on said vehicle and said load carrying device is transported by said vehicle; and a securing assembly selectively engaging said load carrying device, said securing assembly being coupled to said vehicle such that said securing assembly inhibits said load carrying device and said mountable frame assembly from inadvertently moving off of said vehicle when said load carrying device engages said securing assembly;

wherein said securing assembly is separate of said mountable frame assembly and is mounted separately on said vehicle from said mountable frame assembly;

a pivot actuation assembly configured to pivot a portion of said load carrying device with respect to said mountable frame, said pivot actuation assembly being mounted on said portion of said load carrying means and being removably mounted on said securing assembly separate of said mountable frame;

wherein said pivot actuation assembly includes a ram and a pivot rod mounted on said ram towards one end of said ram; and wherein said securing assembly defines at least one receiving slot for removably receiving said pivot rod, said slot being elongate with a longitudinal axis, said securing assembly being configured such that said longitudinal axis of said receiving slot is inclined with respect to a frame rail of the vehicle when said securing assembly is engaged with the frame rail.

15. The mountable hitch system as set forth in claim 14, wherein said mountable frame assembly comprises a plurality of frame members, each of said frame members being coupled to said load carrying device to provide support for said load carrying device when said load carrying device is being transported by said vehicle.

16. The mountable hitch system as set forth in claim 15, wherein said mountable frame assembly comprises a hitching assembly being coupled to said frame members of said mountable frame assembly, said hitching assembly selectively engaging said vehicle to secure said mountable frame assembly and said load carrying device to said vehicle.

17. The mountable hitch system as set forth in claim 16, wherein said hitching assembly comprises a base plate and a king pin, said base plate being coupled to said frame members such that said base plate extends between said frame members, said king pin being coupled to said base plate such that said king pin extends downwardly from said base plate, said king pin being selectively received by a fifth wheel of said vehicle to secure said mountable frame assembly and said load carrying device to said vehicle.

18. The mountable hitch system as set forth in claim 14, further comprising:

a plurality of hinge assemblies being coupled to said mountable frame assembly, each of said hinge assemblies selectively engaging said vehicle to secure said mountable frame assembly to said vehicle.

19. The mountable hitch system as set forth in claim 18, wherein each of said hinge assemblies comprises a hinge plate, said hinge plate of each of said hinge assemblies operationally coupling to frame rails of said vehicle to secure the hinge assemblies to said vehicle.

20. The mountable hitch system as set forth in claim 19, wherein each of said hinge assemblies comprises a block member, said block member being coupled to said hinge plate of the associated one of said hinge assemblies, said block member of each of said hinge assemblies operationally engaging said frame rails of said vehicle to secure said load carrying device to said vehicle.

21. The mountable hitch system as set forth in claim 20, wherein said block member of each said hinge assemblies comprises a block slot, said block slot extending into said block member; and an anchor pin being coupled to said frame rails of said vehicle, said block slot of said block member of each of said hinge assemblies receiving said anchor pin to secure said mountable frame assembly to said vehicle.

22. The mountable hitch system as set forth in claim 21, wherein said block member of each of said hinge assemblies comprises a pair of pin apertures extending through said block member, each of said pin apertures being in communication with said block slot of said block member, one of said pin apertures being aligned with the other of said pin apertures; and each of said hinge assemblies comprising a securing pin, said securing pin being insertable into said pin apertures of said block member of the associated one of said hinge assemblies such that said securing pin extends across said block slot of said block member, said securing pin being for inhibiting said anchor pin inadvertently sliding out of said block slot of said block member when said securing pin is inserted into said pin apertures of said block member of the associated one of said hinge assemblies.

23. The mountable hitch system as set forth in claim 18, further comprising:

an angled brace being coupled to and extending between said hinge assemblies, said angled brace maintaining positioning of said hinge assemblies when said hinge assemblies engage said vehicle.

24. The mountable hitch system as set forth in claim 18, further comprising:

a bracing member being coupled to said mountable frame assembly and said hinge assemblies, said bracing member maintaining positioning of said mountable frame assembly and said hinge assemblies when said hinge assemblies engage said vehicle.

25. The mountable hitch system as set forth in claim 14, wherein said securing assembly comprises a base frame being coupled to said vehicle, said base frame selectively engaging said load carrying device to secure said load carrying device to said vehicle when said mountable frame assembly engages said vehicle.

26. The mountable hitch system as set forth in claim 25, wherein said securing assembly comprises a plurality of receiving members, each of said receiving members being coupled to said base frame, said receiving members selectively engaging said load carrying device to secure said load carrying device to said base frame and said vehicle.

27. The mountable hitch system as set forth in claim 26, wherein each of said receiving members comprises a receiving slot extending into the associated one of said receiving members, said receiving slot of each of said receiving members receiving a portion of said load carrying device to secure said load carrying device to said vehicle.

28. The mountable hitch system as set forth in claim 27, wherein each of said receiving members comprises a retaining pin, said retaining pin being selectively insertable into a pair of retaining apertures of the associated one of said receiving members, said retaining apertures being in communication with said receiving slot of the associated one of said receiving members such that said retaining pin extends across said receiving slot to inhibit inadvertent removal of the portion of said load carrying device from said receiving slot when said retaining pin is positioned in said retaining apertures.

29. The mountable hitch system as set forth in claim 14, further comprising:

a plurality of leg members being operationally coupled to said load carrying device such that each of said leg members extends substantially downward from said load carrying device, each of said leg members being for engaging a support surface such that said leg members support said load carrying device and said mountable frame assembly above the support surface to permit said vehicle to be backed under said load carrying device and said mountable frame assembly when said mounted frame assembly is to engage said vehicle, each of said leg members being selectively actuated to allow said leg members to disengage the support surface when said load carrying device is being transported by said vehicle.

\* \* \* \* \*